Figure 1:
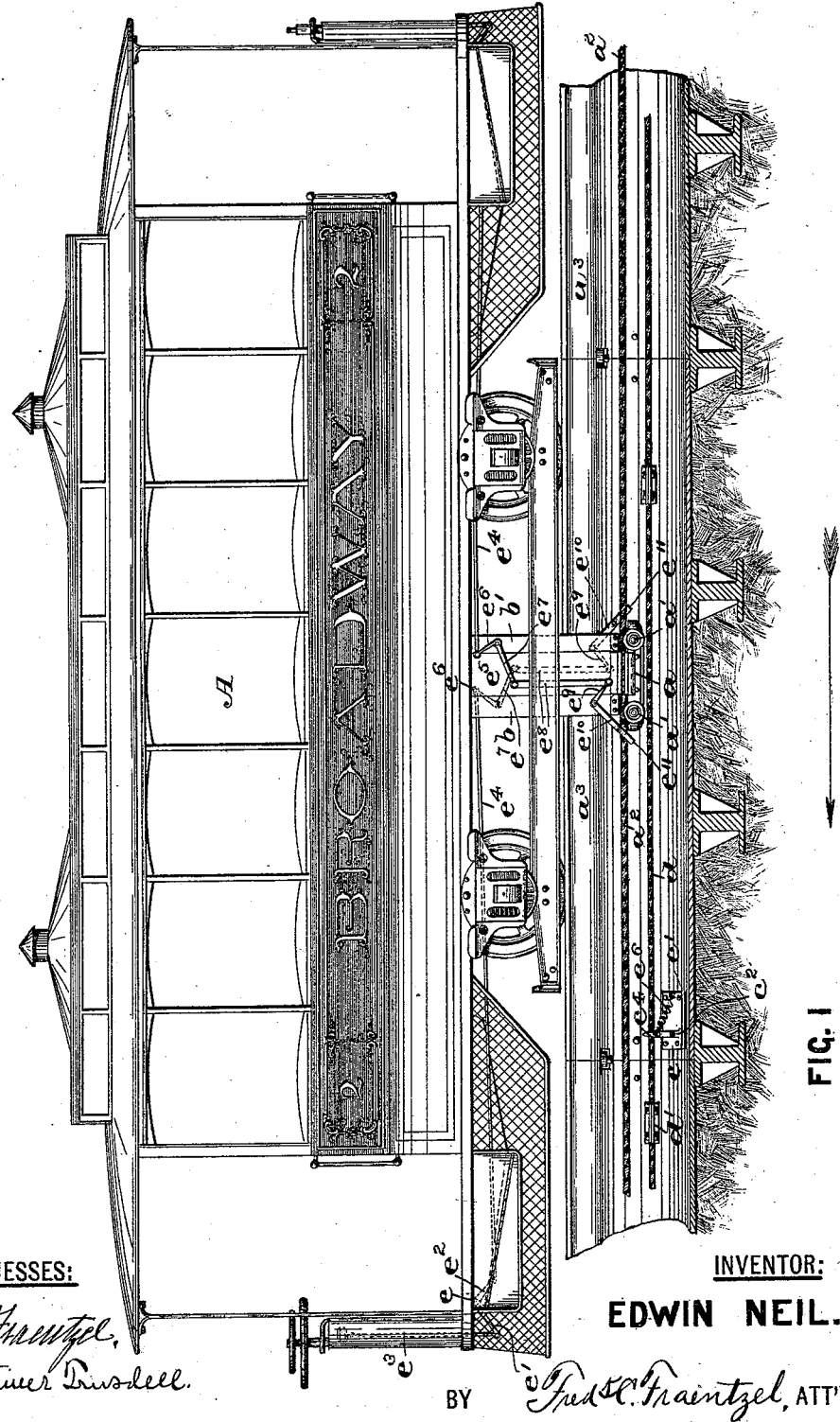

(No Model.) 4 Sheets—Sheet 1.

E. NEIL.
CABLE STOP MECHANISM.

No. 527,069. Patented Oct. 9, 1894.

WITNESSES:
W. B. Fraentzel
B. Mortimer Truesdell

INVENTOR:
EDWIN NEIL.
BY Fred C. Fraentzel, ATT'Y.

(No Model.) 4 Sheets—Sheet 2.
E. NEIL.
CABLE STOP MECHANISM.
No. 527,069. Patented Oct. 9, 1894.
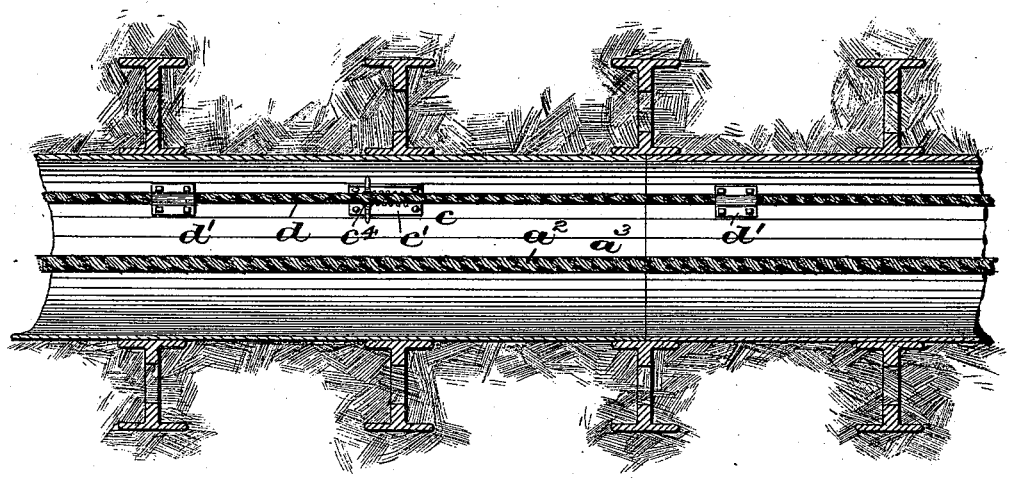
FIG. 2
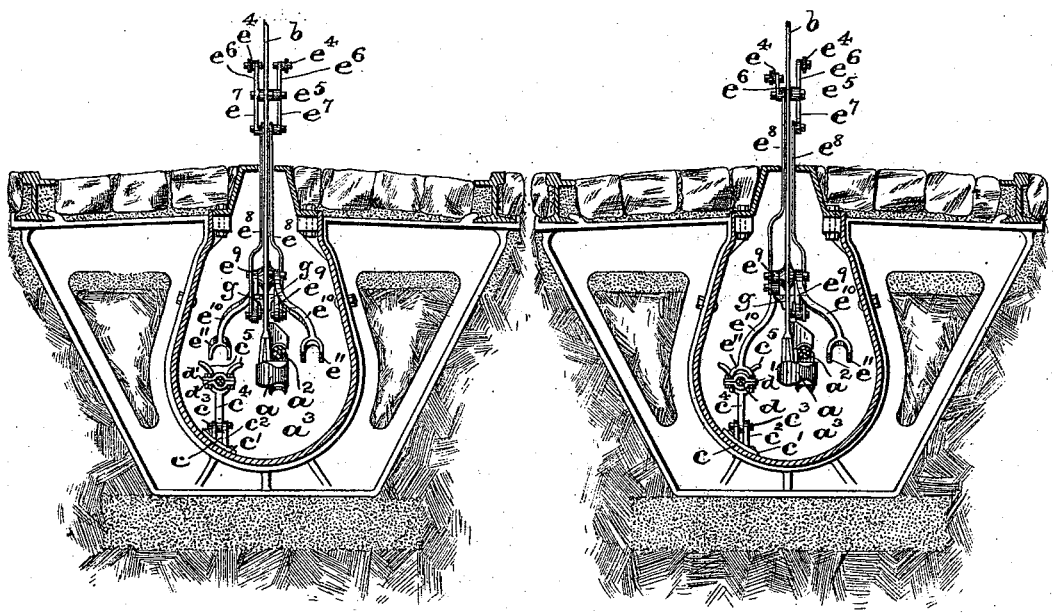
WITNESSES: FIG. 3 FIG. 4 INVENTOR:
EDWIN NEIL.
BY Fred C. Fraentzel, ATT'Y.

(No Model.) 4 Sheets—Sheet 3.

E. NEIL.
CABLE STOP MECHANISM.

No. 527,069. Patented Oct. 9, 1894.

WITNESSES:

INVENTOR:
EDWIN NEIL.
BY Fred C. Fraentzel, ATT'Y.

(No Model.) 4 Sheets—Sheet 4.
E. NEIL.
CABLE STOP MECHANISM.

No. 527,069. Patented Oct. 9, 1894.

WITNESSES:
O. B. Frantzel.
B. Mortimer Trusdell.

INVENTOR:
EDWIN NEIL.
BY Fred C. Frantzel, ATT'Y.

UNITED STATES PATENT OFFICE.

EDWIN NEIL, OF NEWARK, NEW JERSEY.

CABLE STOP MECHANISM.

SPECIFICATION forming part of Letters Patent No. 527,069, dated October 9, 1894.

Application filed July 11, 1894. Serial No. 517,244. (No model.)

*To all whom it may concern:*

Be it known that I, EDWIN NEIL, a citizen of the United States, residing at Newark, in the county of Essex and State of New Jersey, have invented certain new and useful Improvements in Appliances for Controlling the Operation of the Working Cable of Cable Cars; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference more particularly to an appliance to be used on cable cars, for controlling, from a car in motion, the operation of its main working cable.

The invention therefore has for its primary object to provide a means, whereby, in the event of an accident resulting from the entanglement of the working cable in the grip of any car, from any cause, that section of cable on which such accident may happen, can be immediately stopped by the gripman in charge of the car, thereby avoiding injury to life and property. As is well known, much difficulty has heretofore been encountered by the entanglement of a wire strand from the cable in the cable-grip, or from other similar causes, thereby causing what may be termed a "run-away" cable car, and the main features of my invention therefore consists in the arrangement and combination of mechanism on the car, under perfect control of the gripman, adapted to be engaged at the time of need with an idle cable placed in the conduit and parallel with the working cable, and to be connected at the power station with the controlling mechanism of the working cable, whereby said cable is immediately stopped. Other minor features, such as providing chocks or blocks to be attached at intervals to said idle cable; means for supporting said idle or extra cable, ordinarily in a state of rest; and mechanism engaging the chocks or blocks attached to said extra cable, will be fully explained hereinafter.

The several objects of the invention are attained by the mechanism illustrated in the accompanying drawings, in which—

Figures 5, 6:
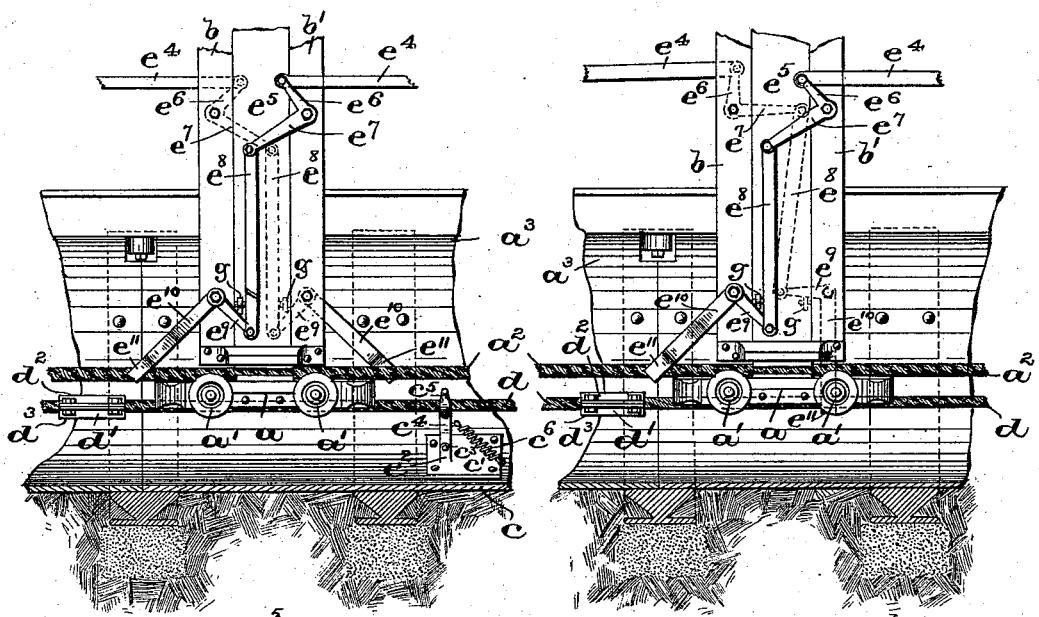
Figure 7:
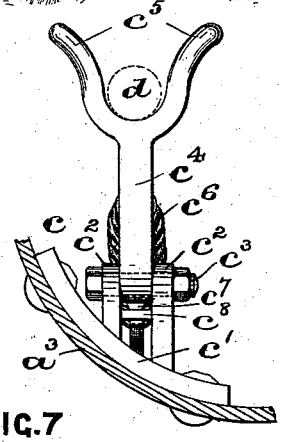
Figure 8:
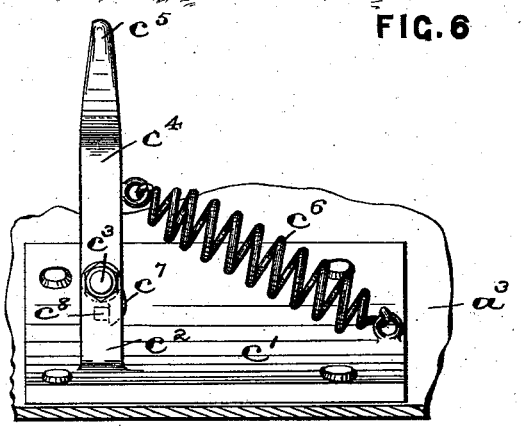
Figure 9:
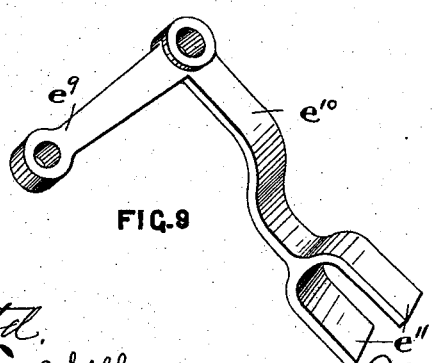
Figure 10:
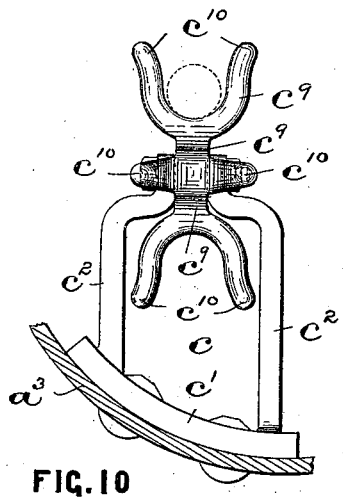
Figure 11:
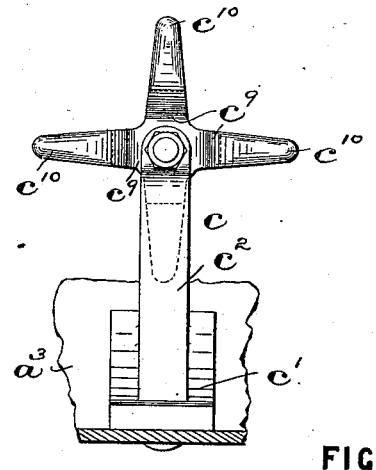
Figure 12:
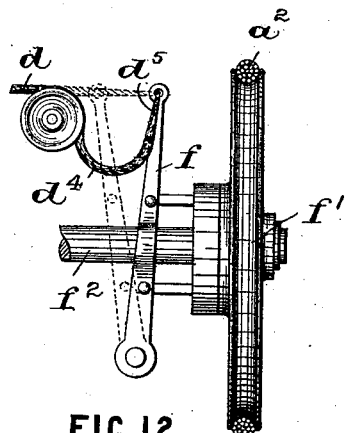
Figure 13:
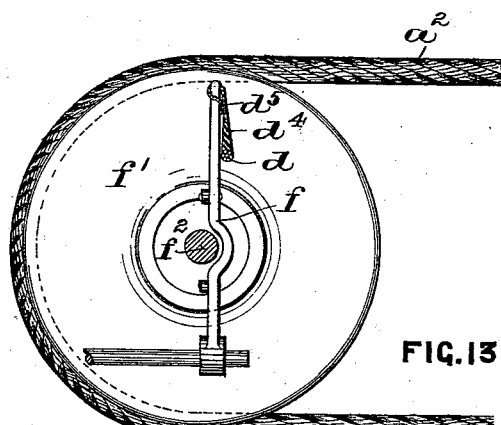
Figure 14:
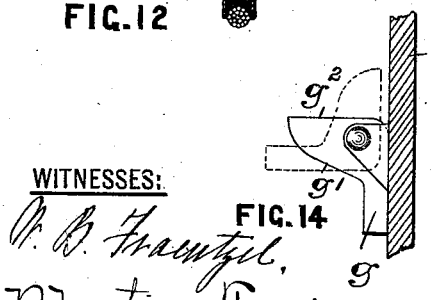
Figure 15:
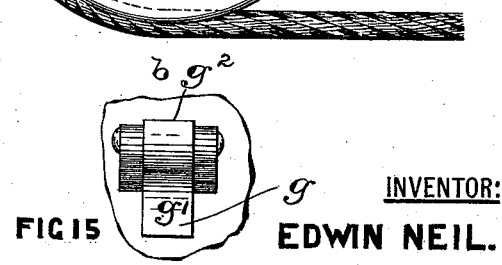

Figure 1 is a side view of a cable car and its cable grip, of any suitable construction, the conduit being represented in longitudinal vertical section, illustrated in connection with said figure, the extra or idle cable and mechanism operated from the car to be engaged with said extra cable. Fig. 2 is a horizontal section of the conduit, illustrating an arrangement of the working cable and the extra or idle cable provided with one form of chocks or blocks, and a device for supporting said cable at rest in the conduit. Fig. 3 is a cross section of the conduit, illustrating the mechanism in front elevation, when out of engagement with the extra or idle cable, and Fig. 4 is a similar view, with said mechanism in its operative engagement with said extra or idle cable to stop the car. Figs. 5 and 6 are side views of the cable grip and said extra cable - operating mechanism, illustrated in said Figs. 3 and 4 respectively. Figs. 7 and 8 are a front view and a side view respectively of spring-actuated supports or carriers in the conduit for supporting the extra or idle cable, and Fig. 9 is a perspective view of a clutch or grip used in connection with the mechanism for engaging with the idle cable. Figs. 10 and 11 are a front and a side elevation respectively, of a modified form of construction of carrier or support for the extra or idle cable. Figs. 12 and 13 are similar views of one form of clutch-mechanism and wheel over which the main or operating cable passes at the power station, illustrating one manner of connecting the one end of the extra or idle cable with the clutch lever, for disconnecting the parts of the clutch and causing the stoppage of the main cable. Figs. 14 and 15 are a front and side view respectively of a pivoted stop secured to the main frame of the cable grip, with which part of the extra or idle cable - mechanism is adapted to come in contact and be held thereby.

Similar letters of reference refer to corresponding parts throughout the several views of the drawings.

In said views, A represents a cable car of any of the well known forms of construction, provided with any well known form of cable grip $a$ supported on the bars $b$ and $b'$, and its wheels $a'$ being in operative contact with the main or working cable $a^2$ in the conduit $a^3$ for operating the car. This mechanism, as illustrated in Fig. 1 is set to propel the car in the direction of the arrow shown in said figure. In said conduit $a^3$, as will be seen from the several figures of the drawings, I have arranged at suitable intervals, supports or carriers $c$, which consist essentially of a plate $c'$ secured by bolts to the conduit, and provided with holding lugs $c^2$. Pivotally secured between said lugs $c^2$ on a pin $c^3$ is a post $c^4$ having a forked end $c^5$. A stiff spring $c^6$ tends to pull said post backwardly and a nosing or spur $c^7$ on said post just below its pivotal support thereby comes in contact with a stop $c^8$ between said lugs $c^2$, which causes the normal upright position of said post for supporting the extra or idle cable $d$ in the forked ends of the said posts $c^4$.

The extra or idle cable $d$ is provided at suitable intervals with chocks or blocks $d'$, consisting essentially, of two plates $d^2$ and $d^3$, firmly secured to the cable by means of bolts, as will be seen from Figs. 2, 5 and 6.

The extra or idle cable-operating mechanism, is illustrated more especially in Figs. 1, 3, 4, 5 and 6, and consists essentially of the following parts:—Pivotally secured underneath the platform of the car is a bell crank $e$, having the arms $e'$ and $e^2$. Connected with said arm $e'$ and extending up above the platform of the car, is an operating lever $e^3$. Connecting with said arm $e^2$ of the bell crank $e$ is a long rod $e^4$ which extends to near the middle of the car and is connected with a second bell crank $e^5$, having the arms $e^6$ and $e^7$, and preferably pivoted to the supporting frame of the cable gripping device, as shown. A rod $e^8$ is connected at one end with a lever $e^9$, which in turn is connected with the clutch arm $e^{10}$, as shown in Fig. 9. Thus it will be seen, that when the car is "running away" from the gripman, caused by the entanglement of the cable grip with the working cable $a^2$, all he has to do is to operate the lever $e^3$ on the platform, and by the intermediately arranged mechanism the clutch end $e^{11}$ of the arm $e^{10}$ will be brought down to embrace the extra or idle cable $d$, see Figs. 4 and 6, thereby bringing said end $e^{11}$ into operative engagement with the chocks or blocks $d'$ on said cable $d$. The "run away" car will thus cause the operation of the cable $d$, until the end $d^4$ connected with a clutch-operating lever $f$ in the power station, see Figs. 12 and 13, will be pulled taut, thereby operating the clutch lever $f$ and causing it to be disconnected from the cable wheel $f'$, which is now loose on the main shaft $f^2$, thereby stopping the main or working cable $a^2$ in the conduit.

As shown in Fig. 12, the extreme end $d^5$ of the cable $d$ may be of sufficient strength to operate the lever $f$, but when the car is moving at great speed with sufficient momentum to carry it some distance before stopping, then said end $d^5$ is weak enough to part, after having first released the clutch-mechanism, without doing any further damage to the working parts of the mechanism. To permit the passage of the clutch end $e^{11}$ of the arm $e^{10}$ and the chocks $d'$ on the cable $d$ over said supports or carriers $c$, without doing any damage to the same, the post $c^4$ has been pivotally arranged, as has been stated, whereby, when said arm $e^{10}$ and a chock $d'$ comes in contact with said post, the latter will be turned down until the other parts have passed over it, and the spring $c^6$ will immediately cause said post to stand in its upright position. Of course the spring is made of sufficient power and strength to also cause the cable $d$ to be raised and supported by all posts $c^4$.

As will be seen from Figs. 1, 3 and 4, the mechanism for operating the extra or idle cable $d$ may be duplicated, the clutch arms $e^{10}$ being arranged on opposite sides of the cable grip, whereby, no matter in which direction a car is being propelled, either of said arms $e^{10}$ can be made to engage with the extra or idle cable $d$, as will be evident. At the same time it will be noticed, that the extra or idle cable-operating mechanism is operative only from the front platform of the car, and no matter, how much the lever on the rear platform is worked by a person on said platform, it cannot be made to engage with the cable $d$, to unnecessarily interfere with the operation of the main or working cable.

In lieu of the supports or carriers illustrated in Figs. 7 and 8, I may provide the plate $c'$ of each carrier with the arms $c^9$ between which is rotatively arranged a device having forked arms $c^{10}$ for supporting the cable $d$. The pivotal arrangement of said device will permit the end $e^{11}$ of the clutch arm $e^{10}$ and the chocks $d'$ to pass over said device when the cable $d$ has been operated. To hold said clutch arm $e^{10}$ in its operative contact with one of the chocks $d'$ on the cable $d$, when operated by the grip man, and to prevent him from loosing his hold on the operating lever $e^3$, said arm $e^9$ in moving upwardly passes over the curved surface $g'$ of a pivoted stop $g$, see Figs. 14 and 15, until said lever or arm $e^9$ rests on the straight surface $g^2$ thereof, and holds all of the parts of the operating mechanism in such locked engagement and the clutch fork or portion $e^{11}$ on the arm $e^{10}$ firmly against the chock $d'$ on the cable, until the car stops, when the parts can be quickly returned to their normal and inoperative positions.

The advantages and benefits derived from my improvements will be evident, for, in case of the entanglement of the cable grip with the main or working cable, the clutch mechanism can be made to engage with the extra or idle cable, and the result of bringing said mechanism into action is to cause the idle cable to move in the same direction with the car, thereby causing a stopping or shutting off of the power driving section of the cable concerned.

Of course it will be obvious that the precise form and arrangements of the several parts herein shown and described are not absolutely essential to my improvements, and they may be varied within the limits of mechanical skill without departing from the scope of my invention, and hence I do not limit my invention to the exact arrangements and combinations of parts herein shown and described.

Having thus described my invention, what I claim is—

1. In an appliance for controlling the operation of the working cable of cable cars, the combination, with said working cable, of an extra or idle cable in the conduit with said working cable, said extra or idle cable being connected at the power station with means for shutting off the power from the working cable, substantially as and for the purposes set forth.

2. In an appliance for controlling the operation of the working cable of cable cars, the combination, with said working cable, of an extra or idle cable in the conduit with said working cable, and mechanism connected with the car body and operated therefrom, to be engaged with said extra or idle cable, to cause the same to move with the car body and shut off the power driving the working cable, substantially as and for the purposes set forth.

3. In an appliance for controlling the operation of the working cable of cable cars, the combination, with said working cable, of an extra or idle cable in the conduit with said working cable, chocks or blocks on said extra or idle cable, a clutch fork on the car body, and mechanism for throwing said fork in holding engagement with one of said chocks or blocks on said extra or idle cable, to cause the same to move with the car body and shut off the power driving the working cable, substantially as and for the purposes set forth.

4. In an appliance for controlling the operation of the working cable of cable cars, the combination, with the working cable, of an extra or idle cable, in the conduit with said working cable, movable supports or carriers for said extra or idle cable, chocks or blocks on said extra or idle cable, a clutch fork on the car body, and mechanism for throwing said fork in holding engagement with one of said chocks or blocks on said extra or idle cable, to cause the same to move with the car body and shut off the power driving the working cable, substantially as and for the purposes set forth.

5. In an appliance for controlling the operation of the working cable of cable cars, the combination, with said working cable, of an extra or idle cable in the conduit with said working cable, supports or carriers for said extra or idle cable, each support comprising therein a suitable base, a spring-actuated post pivotally arranged on said base, and means connected therewith for retaining said post in its upright position, chocks or blocks on said extra or idle cable, a clutch fork on the car body, and mechanism for throwing said fork in holding engagement with one of said chocks or blocks on said extra or idle cable, to cause the same to move with the car-body and shut off the power driving the cable, substantially as and for the purposes set forth.

6. In an appliance for controlling the operation of the working cable of cable cars, the combination, with the said working cable, of an extra or idle cable in the conduit with said working cable, supports or carriers for said extra or idle cable, each support comprising therein a suitable base, a spring-actuated post pivotally arranged on said base, and means connected therewith for retaining said post in its upright position, chocks or blocks on said extra cable, a clutch fork on the car-body, and mechanism for throwing said fork in holding engagement with one of said chocks or blocks on the idle cable, to cause the same to move with the car-body and shut off the power driving the cable, said mechanism consisting, essentially, of an operating lever $e^3$, bell-crank $e$, connecting rod $e^4$, bell crank $e^5$, and a rod $e^8$ connecting said bell-crank $e^5$ with said clutch fork, substantially as and for the purposes set forth.

7. In an appliance for controlling the operation of the working cable of cable cars, the combination, with the working cable of an extra or idle cable in the conduit with said working cable, chocks or blocks on said extra or idle cable, a clutch fork on the car body, and mechanism for throwing said fork in holding engagement with one of said chocks or blocks on said extra or idle cable, to cause the same to move with the car body and shut off the power driving the working cable, said mechanism consisting essentially, of an operating lever $e^3$, bell crank $e$, connecting rod $e^4$, bell crank $e^5$, and a rod $e^8$ connecting said bell crank $e^5$ with said clutch fork, substantially as and for the purposes set forth.

8. In an appliance for controlling the operation of the working cable of cable cars, the combination, with said working cable, of an extra or idle cable in the conduit with said working cable, chocks or blocks on said extra or idle cable, a clutch fork on the car body, and mechanism for throwing said fork in holding engagement with one of said chocks or blocks on said extra or idle cable, to cause the same to move with the car body and shut off the power driving the working cable, said mechanism consisting essentially, of an operating lever $e^3$, bell crank $e$, connecting rod $e^4$, bell crank $e^5$, and a rod $e^8$ connecting said bell crank $e^5$ with said clutch fork, and a pivoted stop $g$ connected with said mechanism to retain the said clutch fork in its holding engagement with said extra or idle cable, substantially as and for the purposes set forth.

In testimony that I claim the invention set forth above I have hereunto set my hand this 6th day of July, 1894.

EDWIN NEIL.

Witnesses:
FREDK. C. FRAENTZEL,
WM. H. CAMFIELD, Jr.